United States Patent
Pigozzi et al.

(10) Patent No.: US 6,250,172 B1
(45) Date of Patent: Jun. 26, 2001

(54) GEAR CHANGE FOR A COMMERCIAL VEHICLE

(75) Inventors: Gian Maria Pigozzi, Brescia; Augusto Caramagno, Turin, both of (IT)

(73) Assignee: Iveco Fiat S.p.A., Turin (IT)

( * ) Notice: Subject to any disclaimer, the term of this patent is extended or adjusted under 35 U.S.C. 154(b) by 0 days.

(21) Appl. No.: 09/517,672

(22) Filed: Mar. 2, 2000

(30) Foreign Application Priority Data

Mar. 5, 1999 (IT) ............................................. TO99A0171

(51) Int. Cl.[7] ................................................. F16H 59/46
(52) U.S. Cl. ............................ 74/336 R; 74/339; 74/360; 477/908
(58) Field of Search ................................ 74/336 R, 339, 74/360, 745; 477/908, 49

(56) References Cited

U.S. PATENT DOCUMENTS

| | | | |
|---|---|---|---|
| 4,676,115 | * 6/1987 | Morscheck et al. | 74/339 |
| 5,050,079 | * 9/1991 | Steeby | 74/336 R |
| 5,054,591 | 10/1991 | Braun . | |
| 5,315,514 | * 5/1994 | Steeby et al. | 74/336 R X |
| 5,416,698 | 5/1995 | Hutchinson . | |
| 5,429,005 | * 7/1995 | Fukui et al. | 74/339 X |
| 5,436,833 | * 7/1995 | Janecke | 74/336 R X |
| 5,511,437 | * 4/1996 | Braun | 74/745 X |
| 5,974,906 | * 11/1999 | Stine et al. | 74/336 R X |
| 6,044,721 | * 4/2000 | Genise | 74/336 R X |

FOREIGN PATENT DOCUMENTS 0 737 828    10/1996    (EP) .

* cited by examiner

*Primary Examiner*—Charles A Marmor
*Assistant Examiner*—Ha Ho
(74) *Attorney, Agent, or Firm*—Kenyon & Kenyon

(57) ABSTRACT

A gear change for a commercial vehicle comprising a main group defining a plurality of transmission ratios and an auxiliary group with two transmission ratios actuated by an actuator with three positions corresponding respectively to two coupling positions and one neutral position; the actuator is controlled by a control unit in response to actuating signals received by manual selectors, and it is adapted to place the auxiliary group in the neutral position if the speed of rotation of the input shaft exceeds a predetermined threshold value.

7 Claims, 1 Drawing Sheet

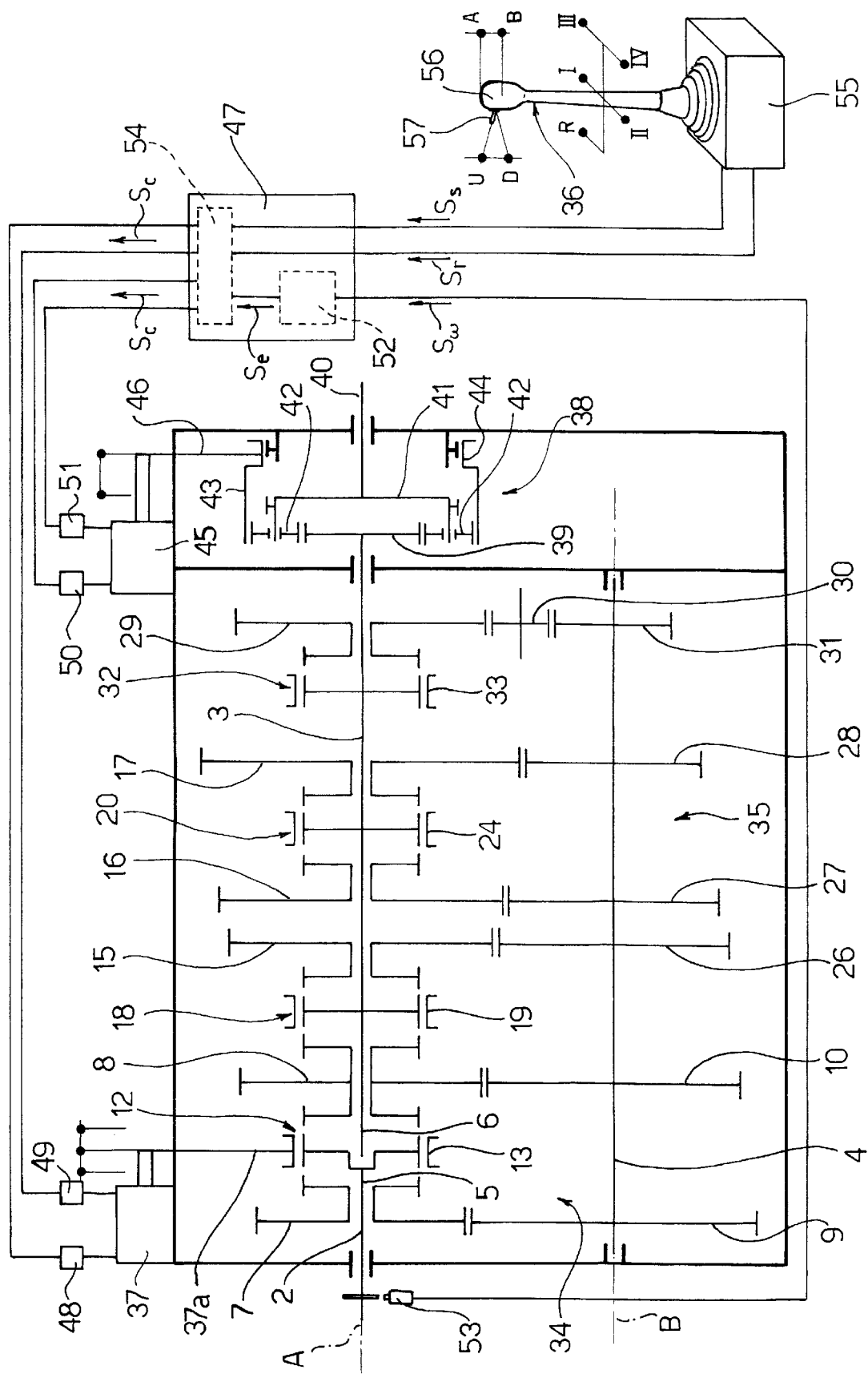

GEAR CHANGE FOR A COMMERCIAL VEHICLE

The present invention relates to a gear change for a commercial vehicle.

BACKGROUND OF THE INVENTION

It is known that commercial vehicles are provided with a gear change with a high number of gear ratios, for example eight, twelve or sixteen forward gear ratios and one or more reverse gear ratios.

The known gear changes generally comprise two or three groups or stages arranged in cascade with one another and each defining a reduced number (from two to four) of transmission ratios; therefore, the total number of gear ratios of the gear change is defined by the product of the transmission ratios of the individual stages.

A typical configuration is one comprising a main group or "main box" with four ratios plus reverse and at least one auxiliary group or "range" disposed downstream of the main stage and defining two transmission ratios for a total of eight gear ratios. The transmission ratios of the auxiliary group are calculated so as to define, in combination with the transmission ratios of the main group, two sets of gear ratios (I,II,III,IV; V,VII,VIII) which are separate and adjacent one another.

The selection and engagement of the gear ratios are controlled by a manually operated lever, the control grid of which (i.e. the entirety of the paths along which the lever has to be moved to select and disengage the various gear ratios) becomes increasingly complex as the number of gear ratios increases.

Referring to the example illustrated above (eight forward gear ratios), the grid may be of the so-called "double H" type; the gear ratios are disposed in pairs (I and II; III and IV; etc.) in respective engagement planes which can be selected by moving the lever along a selection plane (generally transversal with respect to the direction of travel of the vehicle); the gear ratios associated with the selected engagement plane can be engaged by subsequently moving the lever along the engagement plane forwards (odd gear ratios) or rearwards (even gear ratios) with respect to the selection plane.

Since the overall dimensions of the grid are limited for ergonomic and space reasons, as the number of gear ratios increases inevitable the distance between the various engagement planes decreases; in operation, this may give rise to the possibility of selection errors in the engagement plane, resulting in the engagement of incorrect gear ratios.

With the aim of resolving this problem selector levers with a "repeated H" grid have been proposed; in this case the grid is a simple H but the lever is provided with a selector which can move vertically making it possible to "split" the grid itself into two superimposed planes, to each of which corresponds a respective transmission ratio of the auxiliary group. The selection of the transmission ratios of the main group takes place in each of the two planes, said selection being easy and reliable since the distance between the planes of engagement is greater than in the case of a corresponding double H grid.

However, this arrangement also has drawbacks since it is possible for the driver to move the selector inadvertently into the upper level or lower lever, or vice versa, when changing gear, which in some cases may have serious consequences both for driving safety and for the mechanical integrity of the power plant. For example, when changing gear so as to "drop down" from the eighth gear ratio an error of this type could result in the engagement of third gear instead of seventh gear, of second gear instead of sixth gear, with the obvious risks of causing the engine to run at a speed of rotation greatly exceeding the limits of mechanical strength.

To resolve this problem electronic control systems have been proposed, which at the input receive a plurality of signals relating to the operating parameters of the gear change (speed of rotation of the input and output shafts, gear ratio engaged, gear ratio selected, etc.), and which process said input signals so as to enable or prevent the operation of the selector on the basis of stored maps. However, such systems entail both the use of a complicated and costly control unit and the installation of additional components for the gear change (mechanical locking elements, sensors and associated wiring).

Moreover, systems of the above-mentioned type are not always reliable and may not intervene at the right time in the case of particularly rapid maneuvers.

SUMMARY OF THE INVENTION

The object of the present invention is to devise a gear change which makes it possible to eliminate the drawbacks associated with the above-mentioned known gear changes.

The above object is achieved by the present invention in that it relates to a gear change for a commercial vehicle of the type comprising:
  an input shaft;
  an output shaft;
  a gear-type transmission interposed between said input shaft and said output shaft and comprising at least one main group defining a plurality of main transmission ratios and an auxiliary group with two auxiliary transmission ratios defining respective pluralities of gear ratios of said gear change in combination with the main transmission ratios, said auxiliary group comprising a coupling member which can move between a first coupling position, in which a first auxiliary transmission ratio is activated, and a second coupling position, in which a second auxiliary transmission ratio is activated;
  an actuator for controlling said movable coupling member, and
  a control unit adapted to generate control signals for said actuator in response to a plurality of input signals which are representative of operating parameters of said gear change and of the position of manual selector means associated with said gear change, characterised in that said actuator is adapted to adopt three stable positions which correspond, respectively, to said first position, to said second position and to a third neutral position of said movable coupling member, which is intermediate with respect to said first and second positions, in which said input shaft and said output shaft are uncoupled from one another; said control unit comprising means for comparing the speed of rotation of said input shaft following the engagement of a new gear ratio with a predetermined range of acceptable values, and means for generating control signs to arrange said actuator in said third position in the event that said speed is outside said predetermined range of acceptable values.

BRIEF DESCRIPTION OF THE DRAWING

With a view to a better understanding of the present invention a preferred embodiment will be described non-restrictively by way of example below and with reference to the accompanying drawing which it illustrates schematically.

DETAILED DESCRIPTION OF THE INVENTION

Referring now to the FIGURE, the reference numeral 1 generally denotes an intelligent gear change for a commercial vehicle.

The gear change 1 comprises an input shaft 2 having an axis A, an intermediate shaft 3 coaxial to the input shaft 2 and a countershaft 4 having an axis B parallel to the axis A. The input shaft 2 and the intermediate shaft 3 have respective ends 5,6 adjacent one another and coupled together in a manner making possible relative rotation. Respective gearwheels 7,8 are mounted idle on said ends 5,6, which gearwheels mesh with respective gearwheels 9,10 keyed on the countershaft 4.

The gearwheels 7,8 can be selectively engaged on the end 5 of the input shaft 2 by means of a synchronized coupling 12 provided with sliding coupling sleeve 13.

Three gearwheels 15,16,17 are mounted idle on the intermediate shaft 3 and are of diameters which are greater than the gearwheel 8 and which progressively increase from one to the other. The gearwheels 8,15 can be selectively engaged on the intermediate shaft 3 by means of a synchronized coupling 18 provided with a sliding coupling sleeve 19. In an entirely analogous manner, the gearwheels 16,17 can be selected engaged on the intermediate shaft 3 by means of a synchronized coupling 20 provided with a sliding coupling sleeve 24.

The gearwheels 15,16,17 mesh with corresponding gearwheels 26,27,28 keyed on the countershaft 4.

A further gearwheel 29 is mounted idle on the intermediate shaft 3 and meshes with an idle gear 30 which in turn meshes with a gearwheel 31 keyed on to the countershaft 4. The gearwheel 29 can be coupled to the intermediate shaft 3 by means of a coupling 32 provided with a sliding control sleeve 33.

From a functional point of view, the gearwheels 8,15,16, 17,29 which can be coupled to the intermediate shaft 3, together with the corresponding gearwheels 10,26,27,28,31 on the countershaft 4, define a main stage 35 or "main box" of the gear change 1 with four forward transmission ratios (main transmission ratios) and one reverse transmission ratio; the gearwheels 7,8, which can be coupled to the input shaft 2 and the corresponding gearwheels 9,10 on the countershaft 4, form a first auxiliary stage 34 of the gear change 1 or "splitter", defining two auxiliary transmission ratios with a different reduction ratio so as to generate intermediate transmission ratios between the main transmission ratios.

The gearwheel 8 and the gearwheel 10 are considered as belonging both to the auxiliary stage 34 and to the main stage 35, since the gearwheel 8 can be coupled both to the input shaft 2 and to the intermediate shaft 3 and, therefore, conceptually it can be compared to two distinct but equal gearwheels, each of which can be coupled to the respective shaft.

The four forward transmission ratios of the main stage 35 are obtained by coupling to the intermediate shaft 3 respectively the gearwheel 17 (right-hand sleeve 24), the gearwheel 16 (left-hand sleeve 24), the gearwheel 15 (right-hand sleeve 19) and the gearwheel 8 (left-hand sleeve 19).

The sleeves 19,24 and 33 are controlled mechanically by a manually operated lever 36 via a transmission device of known type, not illustrated in the drawing. The lever 36 has a control grid with five positions (four forward travel positions disposed in a simple H and one reverse position).

The two transmission ratios of the auxiliary group are obtained by coupling to the input shaft respectively the gearwheel 7 (left-hand sleeve) and the gearwheel 8 (right-hand sleeve 13).

The sleeve 13 is controlled by an actuator 37 by means of an actuating fork 38 of known type. The actuator 37 is pneumatic and, according to the present invention, is of the type having three mechanically determined positions; two limit positions, left-hand and right-hand respectively, correspond to the above-described respective coupling positions of the sleeve 13; a central position, shown in the drawing, maintains the coupling 12 in a neutral position in which the input shaft 2 is not coupled to the countershaft 4 and, therefore, is angularly uncoupled also from the intermediate shaft 3, independently of the transmission ratio optionally coupled in the main stage 35.

The gear change 1 further comprises a second auxiliary group 38 or "range" which is essentially formed by an epicyclic reduction gear having as input member a sun gear 39 keyed on the intermediate shaft 3 and an output shaft 40 attached to a train carrier 41.

The sun gear 39 meshes with a plurality of planetary gears 42 which are carried in an angularly free manner by the train carrier 41 and which, in turn, mesh with an internal ring gear 43.

The ring gear 43 is attached to a coupling sleeve 44 which can be displaced axially between a first position (to left with reference to the drawing), in which the ring gear 43 is connected with the train carrier 41, and a second position (to the right with reference to the drawing), in which the ring gear 43 is connected with the gearbox. In said first position, the sun gear 39, the train carrier 41 and the ring gear 43 rotate together with one another, thereby forming a unitary transmission ratio (direct drive) between the intermediate shaft 3 and the output shaft 40; in the second position there is a reduction ratio between the speed of the intermediate shaft 3 and the output shaft 40; these ratios are calculated so as to generate, in combination with the main transmission ratios, two sets of separate and adjacent gear ratios.

The sleeve 44 is controlled by a pneumatic actuator 45 by means of an operating fork 46 of known type.

The auxiliary groups 34 and 38 are controlled by a control unit 47 which is adapted to generate control signals sc for respective solenoid valves 48,49 for operating the actuator 37 and for respective solenoid valves 50,51 for operating the actuator 45 in response to input signals which will be described in detail below.

The solenoid valves 48,49,50,51 are of three-way type, with two normally closed positions. The three positions of the actuator 37 are obtained by energizing respectively the solenoid valve 48 by itself, the solenoid valve 49 by itself or both the solenoid valves 48,49 contemporaneously. The two positions of the actuator 45 are obtained by exciting respectively the solenoid valve 50 by itself and the solenoid valve 51 by itself.

The control unit 47 comprises a comparison circuit 52 connected to an angular velocity sensor 53 associated with the input shaft 2, from which it receives an input signal $s_w$, correlated to the angular velocity of the input shaft 2; when the clutch is closed this velocity obviously coincides with the speed of rotation of the main shaft. The circuit 52 is adapted to compare the input signal $s_w$, i.e. the angular velocity of the input shaft, with a reference value $s_r$ corresponding to an upper limit value of the angular velocity of the input shaft, and to generate at the output an enabling signal $s_e$, the logical level of which depends on the result of the comparison, as will be explained below.

The control unit 47 further comprises a control circuit 54 receiving at the input, in addition to said signal $s_e$, signals $s_s$, $s_r$ generated by transducer means 55 associated with the gearchange lever 36. These transducer means, which are of known type and are thus not described in detail, are adapted to generate said signals $s_s$, $s_r$ in response to the manual actuation of auxiliary selector members 56,57 associated with said lever.

In particular, these members are formed by an auxiliary selector 56 suitably integrated in the lever 36 and which can be actuated in an axial direction with respect thereto between two positions (A,B), and by a small lever 57 which is disposed on the handgrip of the lever itself and which can be moved between two positions (U,D). The selector 56 controls the auxiliary group 38; the transducers 55 generate input signals sr for controlling the auxiliary group 38 having a (logic) value correlated to the position of the selector 56 (for example 1 for position A, 0 for the position B). The small lever 57 controls the auxiliary group 34; the transducer means 55 generate input signals ss for controlling the auxiliary group 34 having a (logic) value correlated to the position of the small lever 57 (for example 1 for position U, 0 for the position D).

The mode of operation of the gear change 1 is as follows:

The transmission ratios in the main group 35 (I,II,III,IV, R) are selected and engaged manually by means of the lever 36.

If in addition to the lever 36 the selector 56 and/or the small lever 57 are actuated, the change of gear ratio also involves the auxiliary group 38 and/or the auxiliary group 34.

In this case, in response to a signal $s_s$ and/or $s_r$, the control circuit 54 of the control unit 47 generates control signals for the solenoid valves associated with the actuators 48,49,50, 51 of the gear change 1 so as to disengage the gear ratio previously engaged and thus engage the new gear ratio required. The logical level of the $s_e$ is normally such that it enables the change of gear ratio.

The actual engagement of the new gear ratio is preceded by a synchronization stage in which the difference between the angular velocities of each gearwheel to be engaged and the associated shaft is progressively eliminated. It may be assumed, in an initial approximation, that the angular velocity of the output shaft 40 remains constant during the gear change (thus disregarding the variation in the speed of the vehicle): therefore, the synchronization brings about a variation in speed of the input shaft 2. In particular, the input shaft 2 is accelerated in gear changes to a lower gear ratio and is retarded in gear changes to a higher gear ratio.

According to the present invention, the circuit 52 of the control unit 47 compares the signal $s_w$, which is representative of the speed of the input shaft 2, with a reference value $s_t$ corresponding to an upper limit of the speed of rotation of the engine, which is compatible with safety and the mechanical integrity of the power plant.

If the signal $s_w$ is lower than said threshold value, i.e. the speed of the input shaft 2 is within an acceptable range of values, the level of the enabling signal $s_e$ is maintained unaltered and the gear changing maneuver is completed.

In the contrary case, i.e. in which the speed of the input shaft is higher than the safety limit, the signal $s_e$ switches and, in response, the control circuit 54 energizes the two solenoid valves 48,49; therefore, the actuator 40 places the sleeve 13 in the central or neutral position.

As a result of this the input shaft 2 is uncoupled from the counter shaft 4 and, therefore, from the intermediate shaft 3. Therefore, the gear change maneuver is prevented and the gear change 1 is placed in a neutral condition.

Advantageously, after a waiting time which is sufficient to attain the neutral condition, the signal $s_e$ is reset to the enabling logic value, awaiting a subsequent selection maneuver.

The advantages which can be achieved with the present invention are evident from a study of the features of the gear change 1.

Above all, gear change maneuver are prevented which are dangerous for safety and for the integrity of the power plant, and which, for example, could take place as a result of unintentionally switching the selector 56 from the selection position for the high gears into the selection position for the low gears.

This function is obtained in a simple and reliable manner and does not require any modification to the structure of the gear change nor any additional components (the sensor 45 is normally present in any intelligent gear change), except for the use of a three-position actuator for the splitter 34. The extra costs of providing the function are thus very low and considerably lower than those associated with the use of an electronic control with mechanical locking of the selector.

Finally, it is evident that the above-described gear change can be subject to modifications and variations without departing from the scope of protection defined by the claims.

In particular, the neutral function in emergency conditions could be entrusted to the auxiliary group 38 rather than to the group 34; in this case, the group 38 would have to be provided with an intermediate neutral position and the actuator 45 would have to have three positions. However, the actuator 37 could be of conventional type with two positions.

What is claimed is:

1. A gear change (1) for a commercial vehicle of the type comprising:

an input shaft (2);

an output shaft (40):

a compound transmission (34,35,38) interposed between said input shaft (2) and said output shaft (40) and comprising at least one main group (35) defining a plurality of main transmission ratios and an auxiliary group (34,38) with two auxiliary transmission ratios defining respective pluralities of gear ratios of said gear change apparatus in combination with the main transmission ratios, said auxiliary group (34,38) comprising a coupling member (13, 44) which can move between a first coupling position, in which a first auxiliary transmission ratio is activated, and a second coupling position, in which a second auxiliary transmission ratio is activated;

an actuator (37, 45) for controlling said movable coupling member (13,44), and a control unit (47) adapted to generate control signals for said actuator (37,45) in response to a plurality of input signals ($s_w$, $s_s$, $s_r$) which are representative of operating parameters of said gear change apparatus and of the position of manual selector (56,57) associated with said gear change (1), characterized in that said actuator (37) is adapted to adopt three stable positions which correspond, respectively, to said first position, to said second position and to a third neutral position of said movable coupling member (13), which is intermediate with respect to said first and second positions, in which said input shaft (2) and said output shaft (40) are uncoupled from one another; said control unit (47) comprising means (52) for comparing the speed of rotation of said input shaft (2) following the engagement of a new gear ratio with a predetermined range of predetermined values, and means (54) for generating control signs ($s_c$) to arrange said actuator (37) in said third position in the event that said speed is outside said predetermined range of predetermined values.

2. A gear change according to claim 1, characterized in that said predetermined range of predetermined values is defined by an upper safety limit value for the speed of rotation of said input shaft (2).

3. A gear change apparatus according to claim 1, characterized in that said manual selector (36,56,57) comprise a lever (36) which can be moved along a control grid having a number of positions corresponding to the transmission ratios of said main group (35) and at least one auxiliary selector member (56,57) with two positions for controlling said auxiliary group (34,38).

4. A gear change apparatus according to claim 1, characterized in that said compound transmission (34,35,38) comprises a first auxiliary transmission group (34) of splitter group and a second auxiliary transmission group (38) of range group type, wherein said auxiliary group (34, 38) is one of said first and second auxiliary transmission groups.

5. A gear change apparatus according to claim 4, characterized in that said manual selector comprise a first auxiliary selector member (57) with two positions for controlling said first auxiliary group (34) and a second auxiliary selector member (56) with two positions for controlling said second auxiliary group (38), said second selector member (56) being integrated in said lever (36) and being axially movable.

6. A gear change apparatus according to claim 4, characterized in that said actuator (37) with three positions is associated with said first auxiliary transmission group (34).

7. A gear change according to claim 4, characterized in that said actuator with three positions is associated with said second auxiliary transmission group (38).

* * * * *